United States Patent
Tong et al.

(10) Patent No.: US 9,134,493 B2
(45) Date of Patent: Sep. 15, 2015

(54) FIBER OPTIC CABLE WITH ELECTRICAL CONNECTORS AT BOTH ENDS

(71) Applicant: Celerity Technologies Inc., Irvine, CA (US)

(72) Inventors: Xiaolin Tong, Irvine, CA (US); Tony Cheng, Laguna Niguel, CA (US); Yumei Zhan, Kunshan (CN); Junxing Cao, Kunshan (CN)

(73) Assignee: CELERITY TECHNOLOGIES INC., Irvine, CA (US)

( * ) Notice: Subject to any disclaimer, the term of this patent is extended or adjusted under 35 U.S.C. 154(b) by 0 days.

(21) Appl. No.: 13/786,867

(22) Filed: Mar. 6, 2013

(65) Prior Publication Data

US 2013/0236144 A1   Sep. 12, 2013

Related U.S. Application Data

(60) Provisional application No. 61/607,809, filed on Mar. 7, 2012.

(51) Int. Cl.
*G02B 6/36* (2006.01)
*G02B 6/42* (2006.01)
*G02B 6/44* (2006.01)

(52) U.S. Cl.
CPC ............ *G02B 6/4293* (2013.01); *G02B 6/4284* (2013.01); *G02B 6/4401* (2013.01)

(58) Field of Classification Search
CPC ..... G02B 6/4284; G02B 6/4293; G02B 6/4401
See application file for complete search history.

(56) References Cited

U.S. PATENT DOCUMENTS 7,401,985 B2 *   7/2008   Aronson et al. ................. 385/89

FOREIGN PATENT DOCUMENTS

| CN | 201903673 U | 7/2011 |
|----|-------------|--------|
| CN | 102466841   | 5/2012 |
| WO | 2012059071  | 5/2012 |

\* cited by examiner

*Primary Examiner* — Omar R Rojas
(74) *Attorney, Agent, or Firm* — Chen Yoshimura LLP

(57) ABSTRACT

A connecting device for a fiber optic cable includes a first part having a first housing and first and second electrical connectors located on the first housing, and a second part having a second housing and a third electrical connector located on the second housing. The second and third electrical connectors are adapted to be mechanically and electrically connect with each other or disconnected from each other. The first part further includes electrical components disposed within the first housing and electrically connected to the first and second electrical connectors. The second part receives end portions of optical fibers of the fiber optic cable, and further includes optical transceivers disposed within the second housing which are electrically connected to the third electrical connector and optically coupled to the optical fibers. Also disclosed is a cable device employing an optical fiber cable and two connecting devices at its two ends, where at least one of the connecting devices has a structure described above.

11 Claims, 4 Drawing Sheets

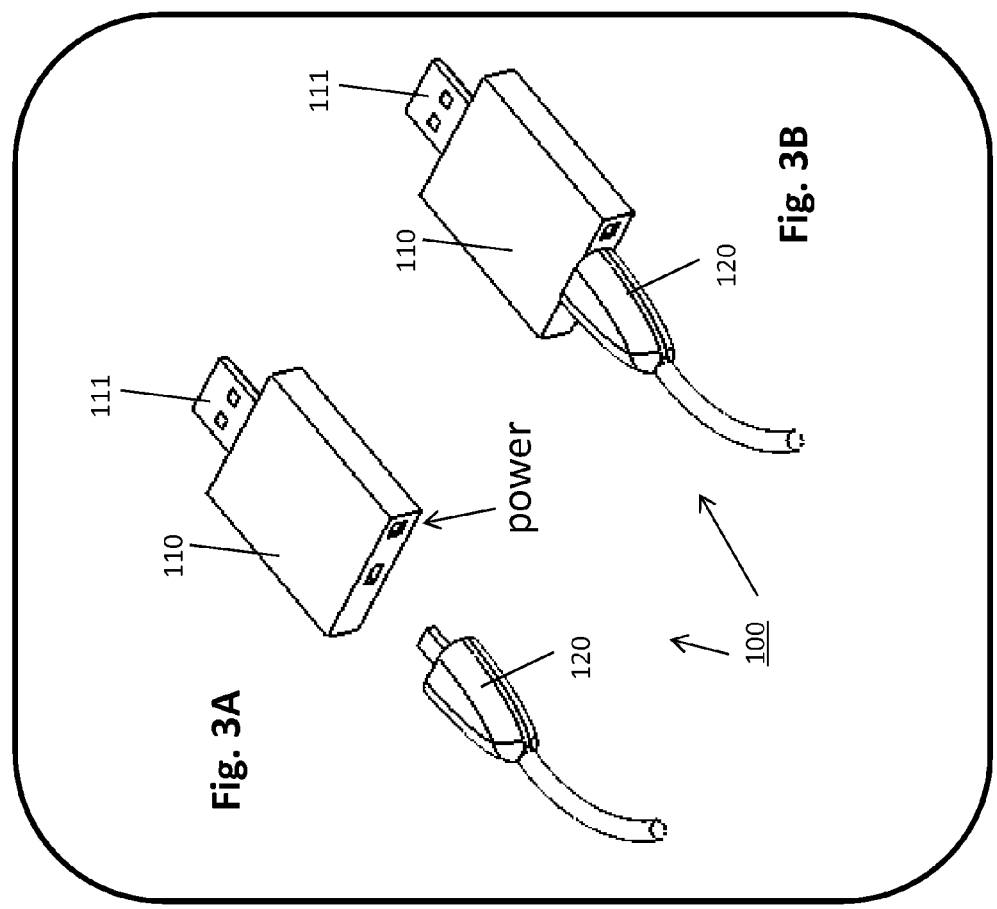
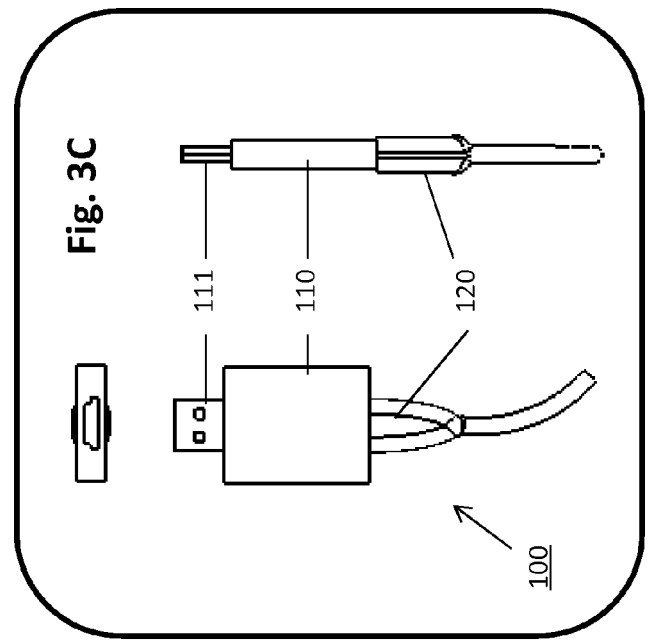

FIBER OPTIC CABLE WITH ELECTRICAL CONNECTORS AT BOTH ENDS

BACKGROUND OF THE INVENTION

This invention relates to a data transmission cable using optical fibers and having electrical connectors at both ends, and related fabrication methods.

SUMMARY OF THE INVENTION

The present invention is directed to a connecting device for a fiber optic cable for converting electrical signals and optical signals to each other, and a cable device having a fiber optic cable and such connecting devices at both ends.

An object of the present invention is to provide such a connecting device with reduced size and increased flexibility.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a connecting device for a fiber optic cable, which includes: a first part having a first housing and first and second electrical connectors located on the first housing, and a second part having a second housing and a third electrical connector located on the second housing, wherein the second and third electrical connectors are adapted to be mechanically and electrically connect with each other or disconnected from each other, wherein the first part further includes electrical components disposed within the first housing and electrically connected to the first and second electrical connectors, wherein the second part receives end portions of optical fibers of the fiber optic cable, and wherein the second part further includes optical transceivers disposed within the second housing, the optical transceivers being electrically connected to the third electrical connector and optically coupled to the optical fibers.

In another aspect, the present invention provides a cable device which includes an optical fiber cable and two connecting devices at its two ends, at least one of the connecting devices having a structure described above.

In another aspect, the present invention also provides a fiber optic cable containing multiple optical fibers within an enclosure, where the fibers are divided into two groups, the first group of fibers being arrayed together and the second group being free fibers. The arrayed fibers are used to carry signals that are desired to be maintained in synchronization with each other, while the free fibers are used to carry signals whose synchronization with other signals is not important.

It is to be understood that both the foregoing general description and the following detailed description are exemplary and explanatory and are intended to provide further explanation of the invention as claimed.

BRIEF DESCRIPTION OF THE DRAWINGS

FIGS. 3A-3C illustrate exemplary exterior views the connecting device of embodiments of the present invention.

DETAILED DESCRIPTION OF THE PREFERRED EMBODIMENTS

Figure 1:
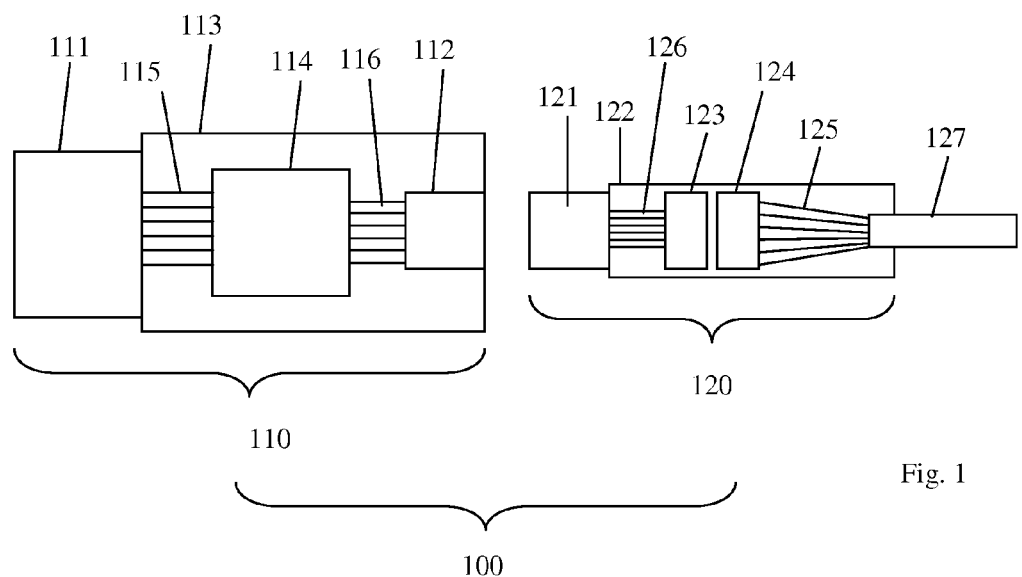
FIG. 1 schematically illustrates a connecting device for a fiber optic cable according to an embodiment of the present invention.
Figure 5A:
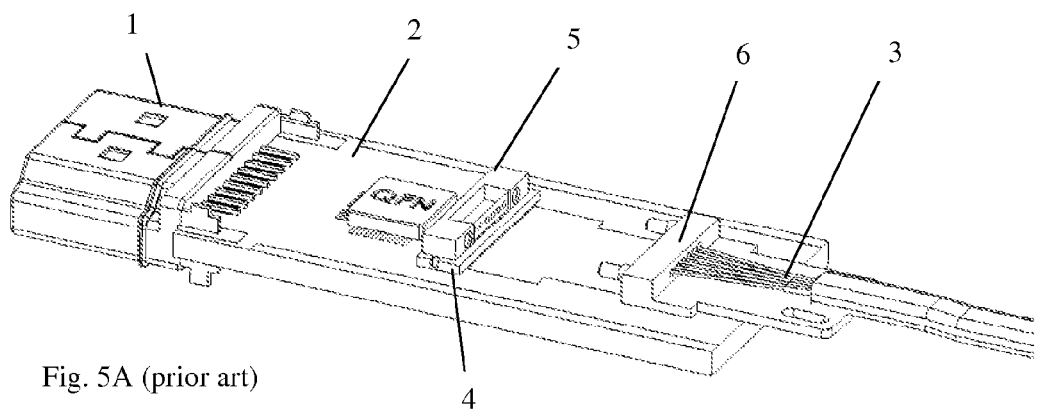
FIGS. 5A, 5B and 5C illustrate previously disclosed connecting devices.

Chinese utility model patent application No. 201020599351.6, filed Nov. 4, 2010 and granted on Jul. 20, 2011 as CN 201903673 U (hereinafter "the CN '673 patent"), is herein incorporated by reference in its entirety. FIGS. 1, 5a and 8f of the CN '673 patent are reproduced as FIGS. 5A, 5B and 5C of the present application. The disclosure of the CN '673 patent is summarized briefly below.

Figure 5B:
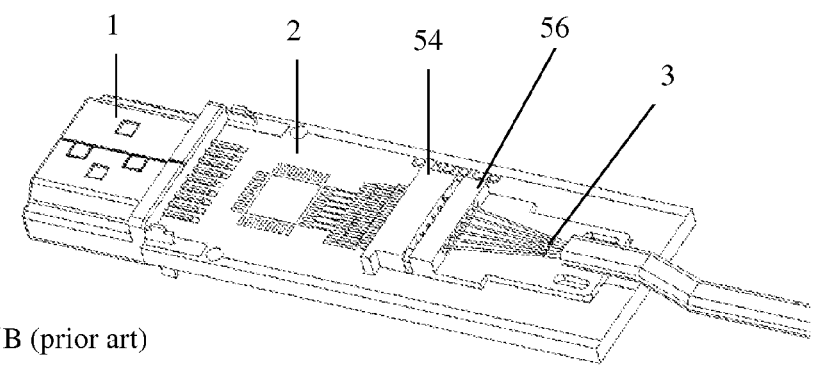
Figure 5C:
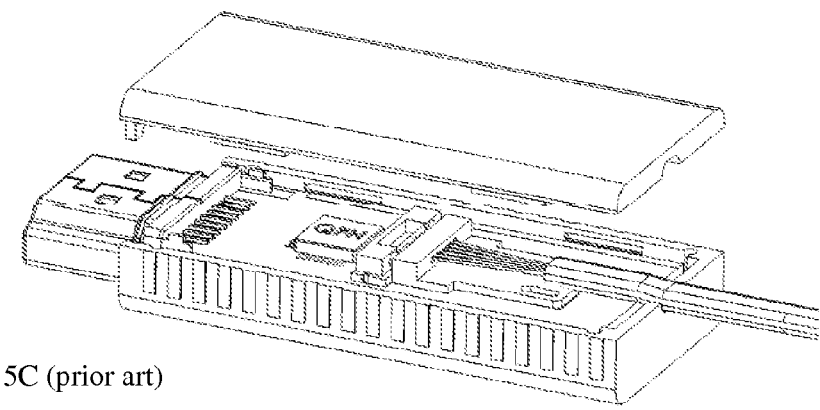

The CN '673 patent describes a connecting device for use with an optical fiber cable for data transmission. As shown in FIGS. 5A, 5B and 5C (FIGS. 1, 5a and 8f of the CN '673 patent), one end of the connecting device is provided with an electrical connector 1 which complies with a standard format such as HDMI (High Definition Multimedia Interface), VGA (Video Graphics Array), DP (DisplayPort), DVI (Digital Visual Interface), etc. The other end of the connecting device accommodates an optical fiber cable or optical fiber bundle. Various components are contained in a housing of the connecting device and mounted on a circuit board 2, and function to convert electrical signals from the electrical connector 1 into optical signals transmitted onto the optical fibers 3, and to convert optical signals from the optical fibers 3 into electrical signals transmitted onto the electrical connector 1. These internal components include, in the example shown in FIGS. 5A and 5C, a chip electrically connected to the electrical connector 1, for processing electrical signals; an optical transceiver block (not shown in FIGS. 5A and 5C) having multiple individual optical transceivers, electrically connected to the chip, for converting optical signals to electrical signals and vice versa; an optical component positioning block 4, for positioning the optical transceivers to the circuit board; a lens block 5, positioned on the optical component positioning block 4, for focusing and reflecting light signals between the optical transceivers and the optical fibers; and an optical fiber positioning block 6, for positioning the optical fibers to the lens block 5. FIG. 5A shows a state where the optical fiber positioning block 6 is not yet aligned with the lens block 5; FIG. 5C shows a state where the components are assembled an placed inside the housing but the top cover of the housing is still open. The example shown in FIG. 5B is similar to the example shown in FIG. 5A except that the multiple individual optical transceivers are directly mounted on the optical component positioning block 54 which faces the optical fiber positioning block 56, and the lens block is omitted.

Embodiments of the present invention improves the connecting device described in the CN '673 patent by separating the various internal components, which are contained in a single housing in the CN '673 patent, into two groups and arrange them in two separate housings. An embodiment of the present invention is schematically illustrated in FIG. 1 of the present disclosure.

As shown in FIG. 1, the connecting device 100 includes a first part 110 and a second part 120 adapted to be electrically and mechanically connected to each other. The first part 110 has a first electrical connector 111 and a second electrical connector 112 disposed on a housing 113. The first connector 111, which may be referred to as the external connector of the connecting device 100, is preferably one that complies with a standard format such as HDMI, VGA, DP, DVI, etc., similar to the electrical connector 1 of the previously disclosed connector device shown in FIGS. 5A-5C. Contained inside the housing 113 are one or more electrical components such as a chip 114 for processing electrical signals. The chip 114 is electrically connected to the first electrical connector 111 by a first set of wires 115, and to the second electrical connector 112 by a second set of wires 116. The chip and the wires may be formed on a circuit board enclosed in the housing 113.

The second part 120 of the connecting device 100 has a first electrical connector 121 disposed on a housing 122. The first electrical connector 121 is designed to electrically and mechanically connect with the second electrical connector 112 of the first part 110. The connectors 112 and 121 are not required to comply with any commonly recognized standard, so long as they can mate with each other. Contained inside the housing 122 are an optical transceiver block 123 including a plurality of optical transceivers (such as laser diodes (LD) and/or photo detectors (PD)), and an optical fiber positioning block 124 for receiving and positioning a set of optical fibers 125 from an optical fiber cable 127. The optical transceivers, which are electrically connected to the first electrical connector 121 by a set of wires 126, convert optical signals to electrical signals and vice versa. The optical fiber positioning block 124 positions the end of the optical fibers 125 relative to the optical transceivers such that light signals are transmitted between the optical transceivers and the optical fibers. Either the optical transceiver block 123 or the optical fiber positioning block 124 or both may include optical elements such as lenses, reflectors, etc. to direct the light signals. Preferably, the optical fibers 125 include multiple fibers for transmitting various signals. In one example, six optical fibers are used for transmitting HDMI signals, four of which carry the Tc, T0, T1 and T2 signals, and two carry the SCL, SDA, HPD, CEC, and ARC signals in a multiplexed manner. The chip 114 carries out the necessary multiplexing/demultiplexing functions.

The optical transceiver block 123 and the optical fiber positioning block 124 may have any suitable structures. In one example, the optical transceiver block 123 has a structure similar to the combined structure of the an optical component positioning block 4, the a lens block 5, and the optical transceiver block shown and described in FIGS. 5A and 5C. In another example, the optical transceiver block 123 has a structure similar to the optical component positioning block 54 shown and described in FIG. 5B. In one embodiment, the optical fiber positioning block 124 has a structure similar to the optical fiber positioning block 6 shown and described in FIG. 5A, or the optical fiber positioning block 56 shown and described in FIG. 5B. Other suitable structures may be used as well.

In the previously disclosed structures shown in FIGS. 5A-5C, the optical transceivers are electrically connected to the chip by wires. In effect, the embodiment shown in FIG. 1 of the instant disclosure divides the components of shown in FIGS. 5A-5C into two groups at the location of these wires, and locate the two groups of components in two separate housings with appropriate electrical connector to connect the two. Preferably, in embodiments of the present invention, most or all electrical signal processing circuitry, including generating drive signals for the laser in the optical transceiver, is located in the first housing, so the second housing contains very little or no electrical signal processing circuitry, enabling the size of the second housing to be minimized. All components related to transmitting and processing of optical signals are located in the second housing. The connection between the two housings only involves electrical connection.

In the embodiment illustrated in FIG. 1, the first electrical connector 111 for the first part 110 is a male connector, but it may also be a male connector. Further, the second electrical connector 112 of the first part 110 is a female connector and the first electrical connector 121 of the second part 120 is a female connector, but the reverse structure may be used.

Figure 2:
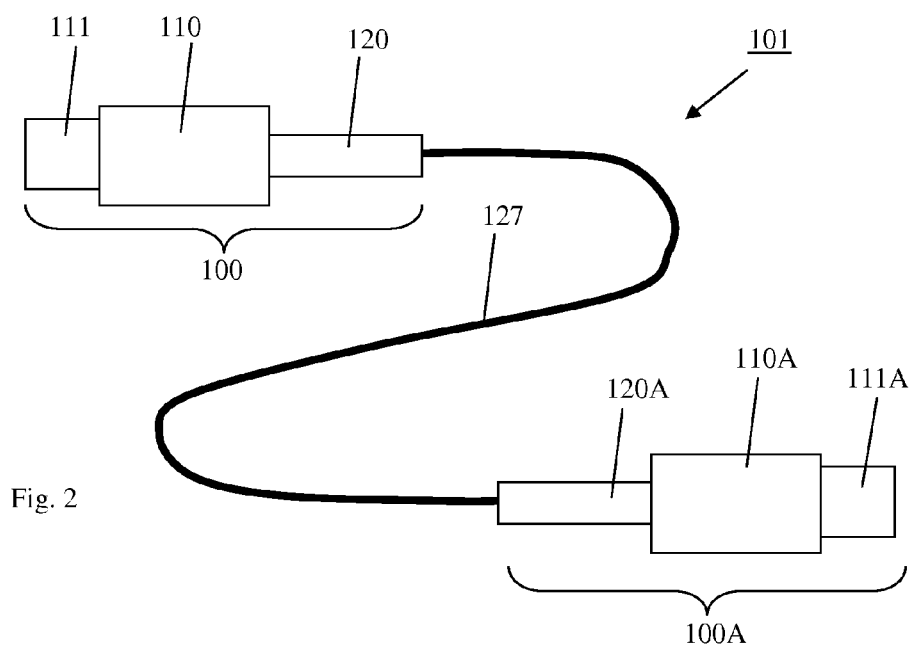
FIG. 2 schematically illustrates a fiber optic cable device having two connecting devices at its ends according to an embodiment of the present invention.

FIG. 2 illustrate an embodiment of the present invention which is a cable device 101 having an optical fiber cable 127 and two connecting devices 100, 100A at its two ends. Typically, the two connecting devices 100, 100A are not identical because one end of the cable device 101 is primarily a transmitting end and the other end is primarily a receiving end (even though different signals may be transmitted in different directions simultaneously). In the example shown in FIG. 2, each connecting device 100, 100A is formed of two parts as described above. Alternatively, one connecting device (e.g. 100) may be formed of two parts while the other (e.g. 100A) may be formed of a single part similar to that of the previously disclosed connector device shown in FIGS. 5A-5C.

The external connectors 111 and 111A and the electronic components within the connecting devices 100 and 100A may be the same or different. When they are different, the cable device may function as an adaptor or converter, which converts electrical signals complying with one standard to electrical signals complying with a different standard. When the two external connectors 111 and 111A are the same or comply with the same standard, the cable device may function as an extender or connector cable to connect two external devices located remotely with respect to each other. For example, one practical application of the cable device 101 is an HDMI to HDMI fiber optic connector for connecting a TV at one end (the receiving end) and a DVD player or another source device at the other end (the transmitting end).

In one particular example, the cable device 101 is an adaptor with an Apple Lightening connector, or an Apple 30-pin connector, or an MHL (Mobile High-Definition Link) connector at one end, and an HDMI connector at the other end. Such a cable will allow an Apple device such as iPad™, iPhone™ and iPod™ or other mobile devices to be connected to an HDTV or other HDMI-compatible display device, so that the images seen on the mobile device can be displayed on the screen of the HDTV or the other HDMI-compatible device. Lightening and 30-pin are two types of connectors used by various versions of Apple's iPad™, iPhone™ and iPod™ devices. MHL is a standard mobile audio/video interface. The signal conversion schemes between Lightening, 30-pin or MHL and HDMI are known, as Lighting connector to HDMI adaptors, 30-pin connector to HDMI adaptors and MHL to HDMI adaptors are known and commercially available from various sources, even though these adaptors use electrical rather than optical cables for signal transmission. In such an adaptor cable, either the Lightening or 30-pin connector, or the HDMI connector, or both, may be made as a two-part structure by implementing embodiments of the present invention.

Referring back to FIG. 1, forming the connecting device 100 in two parts 110 and 120 offers many advantages. First, by locating the electrical components 114 and the external connector 111 in a detachable first part 110, the second part 120 contains very little or no electrical signal processing circuitry; thus, the size of the second part 120 can be reduced, so that it can be much smaller than the previously disclosed connector device shown in FIGS. 5A-5C. For example, the size of the second part 120 can be smaller than 0.35 by 0.25 by 0.75 inches. When connecting two external devices located remotely to each other, the cable device 101 often needs to be passed through narrow passages in a building, such as conduit inside walls of the building. To pass through a pipe having a limited size, the first part 110 can be detached, and the second part 120 with the cable 127 can be passed through the pipe more easily. For example, many older residential buildings have pipes of 0.5 inches in diameter with 90 degree turns. It would have been very difficult or impossible to pass the previously disclosed connector shown in FIGS. 5A-5C through such conduit, whereas the second part 120 of the embodiments of this invention can easily pass through such conduit. After the second part 120 is passed through the conduit, the first part 110 is attached to the second part 120 and the connecting device 100 is ready to be connected to an external device.

Second, in the embodiment of the present invention shown in FIG. 1, the first part 110 of the connecting device 100 contains only electrical components and no optical components. Therefore, it can be fabricated more easily and reliably using mature technologies, which reduces the cost of the overall cable device.

Further, because the connection (i.e. connectors 112 and 121) between the first part 110 and second part 120 is s pure electrical connection without involving any optical signals, the connection is not prone to problems relating to connecting two optical fibers.

It should be noted that FIGS. 1 and 2 of the instant disclosure are only intended as schematic illustrations; they do not necessarily represent the actual shape, size or spatial arrangements of the various components. For example, while the fibers 125 are shown in FIG. 1 as being fanned out, they are not limited to this configuration, and they may go straight out to the LD or PD.

FIGS. 3A-3C illustrates exemplary exterior views of the connecting device 100 according one particular embodiment of the present invention. FIG. 3A shows the two parts 110 and 120 being uncoupled from each other, and FIG. 3B shows the two parts being coupled to each other. FIG. 3C illustrates the front, side and top views of the connecting device 100.

Figure 4:
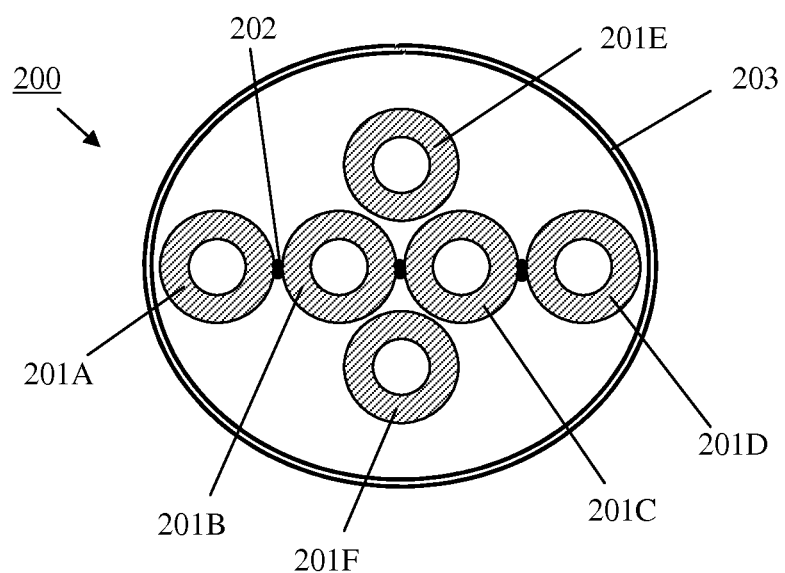
FIG. 4 is a cross-sectional view of a fiber optic cable according to another embodiment of the present invention.

FIG. 4 is a cross-sectional view illustrating a fiber optic cable according to an embodiment of the present invention, which can be used as the cable 127 in FIGS. 1 and 2. As mentioned earlier, HDMI signals may be transmitted via six optical fibers, with four fibers carrying the Tc, T0, T1 and T2 signals and two fibers carrying the various other signals (SCL, SDA, HPD, CEC, and ARC). In the embodiment shown in FIG. 4, the four fibers 201A to 201D that carry the Tc, T0, T1 and T2 signals are formed into a fiber array by aligning the four fibers together side by side with a suitable adhesive material 202. The two other fibers 201E and 201F which carry the other data are not formed into the same fiber array as the first four fibers. In other words, each of fibers 201E and 201F is free and not adhered to any other fibers, and its location with respect to the other fibers is not fixed and may shift as the cable is moved. The six fibers 201A to 201F are enclosed by a protecting enclosure 203 to form the fiber optic cable.

The fiber arrangements described above has certain advantages. Because the Tc, T0, T1 and T2 signals are required to be synchronized as much as possible, the four fibers carrying these signals should be formed into an array so that the changes in their relative lengths are minimized when the cable bends or is coiled up. When multiple fibers are formed into an array, such as shown in FIG. 4 (four fibers 201A to 201D forming an array), the array can be easily bend in one direction but not in the other (perpendicular) direction. In the example shown in FIG. 4, when the fibers 201A-201D extend perpendicular to the plane of the paper, the array can be easily bent in the up-down direction, but not the left-right direction due to the four fibers being adhered to each other side by side in the left-right direction. Thus, reducing the size of the fiber array will make the cable easier to handle. In the embodiment shown in FIG. 4, only four fibers are arrayed together, and the other two fibers 201E and 201F can shift their positions within the enclosure 203 as the cable 200 is bent. The two free fibers can in fact move and fill in the "void" within the enclosure 203 which helps to reduce the strain on the cable. This arrangement balances the need to have the four fibers carrying the Tc, T0, T1 and T2 signals arrayed to maintain signal synchronization, and the need to make the cable easier to handle. If, on the other hand, all six fibers are formed into an array, the resulting array will be larger, making the cable more difficult to bend in the left-right direction and therefore harder to handle.

In the example illustrated in FIG. 4, six fibers are shown with four being arrayed together. This is suitable for transmitting HDMI signals. Depending on the requirements of the signals being transmitted, a different number of fibers may be arrayed and a different number of fibers may be free. The general principle is that only fibers carrying synchronized signals should be arrayed and the other fibers should be free.

It will be apparent to those skilled in the art that various modification and variations can be made in the connecting device and related methods of the present invention without departing from the spirit or scope of the invention. Thus, it is intended that the present invention cover modifications and variations that come within the scope of the appended claims and their equivalents.

What is claimed is:

1. A connecting device for a fiber optic cable, comprising:
   a first part comprising:
      a first housing;
      first and second electrical connectors located on the first housing; and
      electrical components disposed within the first housing and electrically connected to the first and second electrical connectors; and
   a second part comprising:
      a second housing adapted to receive end portions of a plurality of optical fibers of the fiber optic cable;
      a third electrical connector located on the second housing; and
      an optical transceiver block including optical transceivers disposed within the second housing, the optical transceivers being electrically connected to the third electrical connector and adapted to be optically coupled to the plurality of optical fibers;
   wherein the second and third electrical connectors are adapted to be mechanically and electrically connect with each other or disconnected from each other,
   wherein the first electrical connector complies with a predetermined standard,
   wherein the electrical components disposed within the first housing include electrical circuitry for generating drive signals for the optical transceivers of the second part, wherein the second part contains no electrical signal processing circuitry, and wherein the second housing is smaller than 0.35 by 0.25 by 0.75 inches in size and its width is substantially smaller than a width of the first housing.

2. The connecting device of claim 1, wherein the first part further includes a circuit board on which the electrical components are mounted.

3. The connecting device of claim 1, wherein the second part further includes an optical fiber positioning block for receiving and positioning the end portions of the plurality of optical fibers of optical fiber cable relative to the optical transceivers.

4. The connecting device of claim 1, wherein the predetermined standard is HDMI.

5. A cable device comprising:
an fiber optic cable having a plurality of optical fibers;
a first connecting device coupled to a first end of the fiber optical cable, the first connecting device including a first part and a second part,
the first part of the first connecting device including a first housing, first and second electrical connectors located on the first housing, and electrical components disposed within the first housing and electrically connected to the first and second electrical connectors,
the second part of the first connecting device including a second housing adapted to receive end portions of the optical fibers of the fiber optic cable, a third electrical connector located on the second housing, and an optical transceiver block including optical transceivers disposed within the second housing, the optical transceivers being electrically connected to the third electrical connector and adapted to be optically coupled to the optical fibers,
wherein the second and third electrical connectors are adapted to be mechanically and electrically connect with each other or disconnected from each other,
wherein the first electrical connector complies with a first predetermined standard,
wherein the electrical components disposed within the first housing include electrical circuitry for generating drive signals for the optical transceivers of the second part, wherein the second part contains no electrical signal processing circuitry, and wherein the second housing is smaller than 0.35 by 0.25 by 0.75 inches in size and its width is substantially smaller than a width of the first housing, and
a second connecting device coupled to a second end of the fiber optical cable, the second connecting device including a fourth electrical connector which complies with a second predetermined standard.

6. The cable device of claim 5, wherein the first part further includes a circuit board on which the electrical components are mounted.

7. The cable device of claim 5, wherein the second part further includes an optical fiber positioning block for receiving and positioning the end portions of the plurality of optical fibers of optical fiber cable relative to the optical transceivers.

8. The cable device of claim 5, wherein the second predetermined standard is the same as the first predetermined standard.

9. The cable device of claim 5, wherein the second predetermined standard is different from the first predetermined standard.

10. The cable device of claim 9, wherein the electrical components in the first housing converts between electrical signals complying with the first predetermined standard and electrical signals complying with the second predetermined standard.

11. The cable device of claim 5, wherein the first electrical connector is an HDMI connector and the fourth electrical connector is a Lightening connector or an 30-pin connector or an MHL (Mobile High-Definition Link) connector.

\* \* \* \* \*